(12) United States Patent
Liu

(10) Patent No.: US 12,181,760 B2
(45) Date of Patent: Dec. 31, 2024

(54) ARRAY SUBSTRATE AND LIQUID CRYSTAL DISPLAY PANEL

(71) Applicant: TCL China Star Optoelectronics Technology Co., Ltd., Guangdong (CN)

(72) Inventor: Qian Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/621,969

(22) PCT Filed: Nov. 24, 2021

(86) PCT No.: PCT/CN2021/132868
§ 371 (c)(1),
(2) Date: Dec. 22, 2021

(87) PCT Pub. No.: WO2023/087346
PCT Pub. Date: May 25, 2023

(65) Prior Publication Data
US 2024/0288736 A1    Aug. 29, 2024

(30) Foreign Application Priority Data
Nov. 18, 2021   (CN) .......................... 202111367988.1

(51) Int. Cl.
*G02F 1/1362*   (2006.01)
*G02F 1/1343*   (2006.01)

(52) U.S. Cl.
CPC .. *G02F 1/136286* (2013.01); *G02F 1/134372* (2021.01)

(58) Field of Classification Search
CPC .................................................... G02F 1/1362
See application file for complete search history.

(56) References Cited

U.S. PATENT DOCUMENTS

2003/0086045 A1\*   5/2003   Ono .................. G02F 1/134309
349/141
2003/0133066 A1\*   7/2003   Ono .................. G02F 1/134363
349/141
(Continued)

FOREIGN PATENT DOCUMENTS

CN          101093329 A         12/2007
CN          102135691 A         7/2011
(Continued)

OTHER PUBLICATIONS

Chinese Office Action issued in corresponding Chinese Patent Application No. 202111367988.1 dated Jun. 28, 2022, pp. 1-9.
(Continued)

*Primary Examiner* — Sang V Nguyen
(74) *Attorney, Agent, or Firm* — Nathan & Associates; Menachem Nathan

(57) ABSTRACT

The present application discloses an array substrate and a liquid crystal display panel. In the array substrate and the liquid crystal display panel provided in the present application, a common electrode signal is transmitted to an auxiliary wire through a first signal lead wire and transmitted to a common electrode through a second signal lead wire by providing the first signal lead wire and the second signal lead wire. When the auxiliary wire is disconnected, the common electrode signal can be maintained through a plurality of paths.

20 Claims, 3 Drawing Sheets

(56) References Cited

U.S. PATENT DOCUMENTS

| | | | |
|---|---|---|---|
| 2004/0125300 A1 | 7/2004 | Lee | |
| 2007/0296901 A1 | 12/2007 | Seo et al. | |
| 2009/0058785 A1 | 3/2009 | Kim et al. | |
| 2009/0201455 A1* | 8/2009 | Murai | G02F 1/134363 349/139 |
| 2012/0069286 A1* | 3/2012 | Huang | G02F 1/136286 257/E21.627 |
| 2014/0184964 A1* | 7/2014 | Byeon | G02F 1/134309 349/138 |
| 2016/0148952 A1* | 5/2016 | Chen | H01L 27/1244 257/390 |
| 2021/0124440 A1* | 4/2021 | Li | G06F 3/041 |

FOREIGN PATENT DOCUMENTS

| | | | |
|---|---|---|---|
| CN | 103869563 A | 6/2014 | |
| CN | 104362155 A | 2/2015 | |
| CN | 204270000 U | 4/2015 | |
| CN | 105470266 A | 4/2016 | |
| CN | 105487720 A | 4/2016 | |
| CN | 105870151 A | 8/2016 | |
| CN | 105974689 A | 9/2016 | |
| CN | 107193422 A | 9/2017 | |
| CN | 210295063 U | 4/2020 | |
| CN | 114137766 * | 3/2022 | G02F 1/1362 |
| JP | 200832899 A | 2/2008 | |
| JP | 2014130321 A | 7/2014 | |
| JP | 201915976 A | 1/2019 | |
| WO | 2008038432 A1 | 4/2008 | |
| WO | 2017126438 A1 | 7/2017 | |

OTHER PUBLICATIONS

International Search Report in International application No. PCT/CN2021/132868, mailed on Aug. 23, 2022.
Written Opinion of the International Search Authority in International application No. PCT/CN2021/132868, mailed on Aug. 23, 2022.
Japanese Office Action issued in corresponding Japanese Patent Application No. 特願2021-572924 dated Feb. 5, 2024, pp. 1-5.

* cited by examiner

ARRAY SUBSTRATE AND LIQUID CRYSTAL DISPLAY PANEL

BACKGROUND OF DISCLOSURE

Field of Disclosure

The present disclosure relates to a field of display technology, in particular to an array substrate and a liquid crystal display panel.

Description of Prior Art

In a liquid crystal display panel, a common electrode forms a horizontal electric field together with a pixel electrode, thereby realizing display. A portion in which backlight passes through pixels as a display area to produce red, green, and blue primary colors is referred to as an opening area. In order to improve viewing angle and display efficiency, electrodes in the opening area which deflect liquid crystals are usually designed as stripes. Generally, there are two design cases in which the common electrode is defined in a stripe shape and the pixel electrode is defined in a stripe shape. When one kind of the electrodes is a striped design, another electrode is designed to cover an entire opening area.

In a case where the pixel electrode is defined in a stripe shape and the common electrode is designed to cover the entire opening area, in order to reduce a resistance of the common electrode, reduce a coupling effect caused by signal disturbance of a scan line and a data line, thereby improving display effect, an additional layer of auxiliary wires is added to the common electrode. However, the auxiliary wires are easily broken, which affects stability of a common electrode signal and further affects the display effect.

SUMMARY OF DISCLOSURE

The present disclosure provides an array substrate and a liquid crystal display panel, which can maintain stability of a common electrode signal, thereby improving display effect.

In one aspect, the present disclosure provides an array substrate, comprising:
- a common electrode, wherein the common electrode is a planar electrode;
- an auxiliary wire disposed on the common electrode and in contact with the common electrode; and
- a signal lead wire comprising a first signal lead wire connected to the auxiliary wire and a second signal lead wire connected to the common electrode.

In the array substrate provided in the present disclosure, the auxiliary wire comprises a plurality of first auxiliary wires and a second auxiliary wire; the plurality of first auxiliary wires are spaced apart in a first direction, each of the first auxiliary wires extends in a second direction; each of the first auxiliary wires is connected to the second auxiliary wire, and the second auxiliary wire is connected to the first signal lead wire.

In the array substrate provided in the present disclosure, the second auxiliary wire comprises a first wire segment and a second wire segment; and
each of the first auxiliary wires comprises a first end and a second end, the first end is connected to the first wire segment, and the second end is connected to the second wire segment.

In the array substrate provided in the present disclosure, the second auxiliary wire further comprises a third wire segment and a fourth wire segment, and the first wire segment, the third wire segment, the second wire segment, and the fourth wire segment are sequentially connected end to end.

In the array substrate provided in the present disclosure, the auxiliary wire further comprises a plurality of third auxiliary wires spaced apart in the second direction; and
the third wire segment is connected to the first auxiliary wire close to the third wire segment through the plurality of third auxiliary wires.

In the array substrate provided in the present disclosure, the auxiliary wire further comprises a plurality of fourth auxiliary wires spaced apart in the second direction; and
the fourth wire segment is connected to the first auxiliary wire close to the fourth wire segment through the plurality of the fourth auxiliary wires.

In the array substrate provided in the present disclosure, the second signal lead wire comprises a plurality of first sub-signal lead wires and a second sub-signal lead wire; and
the plurality of first sub-signal lead wires are spaced apart in the second direction, each of the first sub-signal lead wires extends in the first direction; and each of the first sub-signal lead wires is connected to the second sub-signal lead wire.

In the array substrate provided in the present disclosure, the second sub-signal lead wire comprises a first portion, a second portion, a third portion, and a fourth portion, the first portion, the third portion, the second portion, and the fourth portion are sequentially connected end to end and surround the plurality of first sub-signal lead wires.

In the array substrate provided in the present disclosure, the array substrate comprises a substrate, a first metal layer comprising the first signal lead wire and the second signal lead wire, a first insulating layer, a second metal layer, a second insulating layer, a planarization layer, a common electrode layer comprising the common electrode, an auxiliary wire layer comprising the auxiliary wire, a third insulating layer, and a pixel electrode layer stacked in sequence.

In the array substrate provided in the present disclosure, the array substrate is defined with a first via, a second via, and a third via, the first via penetrates the first insulating layer, the second via penetrates the third insulating layer, the third via penetrates the third insulating layer, the auxiliary wire layer, the common electrode layer, the planarization layer, and the second insulating layer; and
the second metal layer comprises a first connection metal extending into the first via; the pixel electrode layer comprises a first connection electrode extending into the second via and the third via; and the auxiliary wire is connected to the first signal lead wire through the first connection electrode and the first connection metal.

In the array substrate provided in the present disclosure, the array substrate is defined with a fourth via, a fifth via, and a sixth via, the fourth via penetrates the first insulating layer, the fifth via penetrates the third insulating layer and the auxiliary wire layer, and the sixth via penetrates the third insulating layer, the auxiliary wire layer, the common electrode layer, the planarization layer, and the second insulating layer; and
the second metal layer comprises a second connection metal extending into the fourth via; the pixel electrode layer comprises a second connection electrode extending into the fifth via and the sixth via; and the common electrode is connected to the second signal lead wire through the second connection electrode and the second connection metal.

In a second aspect, the present disclosure provides a liquid crystal display panel, comprising:
an array substrate;
a color film substrate disposed opposite to the array substrate; and
a liquid crystal layer disposed between the array substrate and the color film substrate;
the array substrate comprises:
a common electrode, wherein the common electrode is a planar electrode;
an auxiliary wire disposed on the common electrode and in contact with the common electrode; and
a signal lead wire comprising a first signal lead wire connected to the auxiliary wire and a second signal lead wire connected to the common electrode.

In the liquid crystal display panel provided in the present disclosure, the auxiliary wire comprises a plurality of first auxiliary wires and a second auxiliary wire; the plurality of the first auxiliary wires are spaced apart in a first direction, each of the first auxiliary wires extends in a second direction; and each of the first auxiliary wires is connected to the second auxiliary wire, and the second auxiliary wire is connected to the first signal lead wire.

In the liquid crystal display panel provided in the present disclosure, the second auxiliary wire comprises a first wire segment and a second wire segment; and
each of the first auxiliary wires comprises a first end and a second end, the first end is connected to the first wire segment, and the second end is connected to the second wire segment.

In the liquid crystal display panel provided in the present disclosure, the second auxiliary wire further comprises a third wire segment and a fourth wire segment, and the first wire segment, the third wire segment, the second wire segment, and the fourth wire segment are sequentially connected end to end.

In the liquid crystal display panel provided in the present disclosure, the auxiliary wire further comprises a plurality of third auxiliary wires spaced apart in the second direction; and
the third wire segment is connected to the first auxiliary wire close to the third wire segment through the plurality of third auxiliary wires.

In the liquid crystal display panel provided in the present disclosure, the auxiliary wire further comprises a plurality of fourth auxiliary wires spaced apart in the second direction; and
the fourth wire segment is connected to the first auxiliary wire close to the fourth wire segment through the plurality of the fourth auxiliary wires.

In the liquid crystal display panel provided in the present disclosure, the second signal lead wire comprises a plurality of first sub-signal lead wires and a second sub-signal lead wire; and
the plurality of first sub-signal lead wires are spaced apart in the second direction, each of the first sub-signal lead wires extends in the first direction; and each of the first sub-signal lead wires is connected to the second sub-signal lead wire.

In the liquid crystal display panel provided in the present disclosure, the second sub-signal lead wire comprises a first portion, a second portion, a third portion, and a fourth portion, the first portion, the third portion, the second portion, and the fourth portion are sequentially connected end to end and surround the plurality of first sub-signal lead wires.

In the liquid crystal display panel provided in the present disclosure, the array substrate comprises a substrate, a first metal layer comprising the first signal lead wire and the second signal lead wire, a first insulating layer, a second metal layer, a second insulating layer, a planarization layer, a common electrode layer comprising the common electrode, an auxiliary wire layer comprising the auxiliary wire, a third insulating layer, and a pixel electrode layer stacked in sequence.

In the prior art, a common electrode signal is transmitted to a common electrode through only one signal lead wire, and then the common electrode signal is transmitted to an auxiliary wire through the common electrode. In the array substrate and the liquid crystal display panel provided in the present disclosure, the first signal lead wire and the second signal lead wire are defined, the common electrode signal is transmitted to the auxiliary wire through the first signal lead wire, and is transmitted t to the common electrode through the second signal lead wire. That is, the common electrode signal is transmitted to the auxiliary wire and the common electrode through different signal lead wires, and thus a plurality of identical common electrode signal loops are formed. When the auxiliary wire is disconnected, the common electrode signal wire can be maintained through a plurality of paths, thereby ensuring stability of the common electrode signal, and improving display effect.

DESCRIPTION OF DRAWINGS

In order to more clearly explain technical solutions in embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Technical solutions in embodiments of the present disclosure will be clearly and completely described below in conjunction with drawings in embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

It should be understood that specific implementation described here are merely used to illustrate and explain the present disclosure, rather than limit the present disclosure. Terms "first", "second", "third", "fourth", "fifth", "sixth", etc. in the specification and claims of the present disclosure are used to distinguish different objects, and do not have to be used to describe a specific order.

Figure 1:
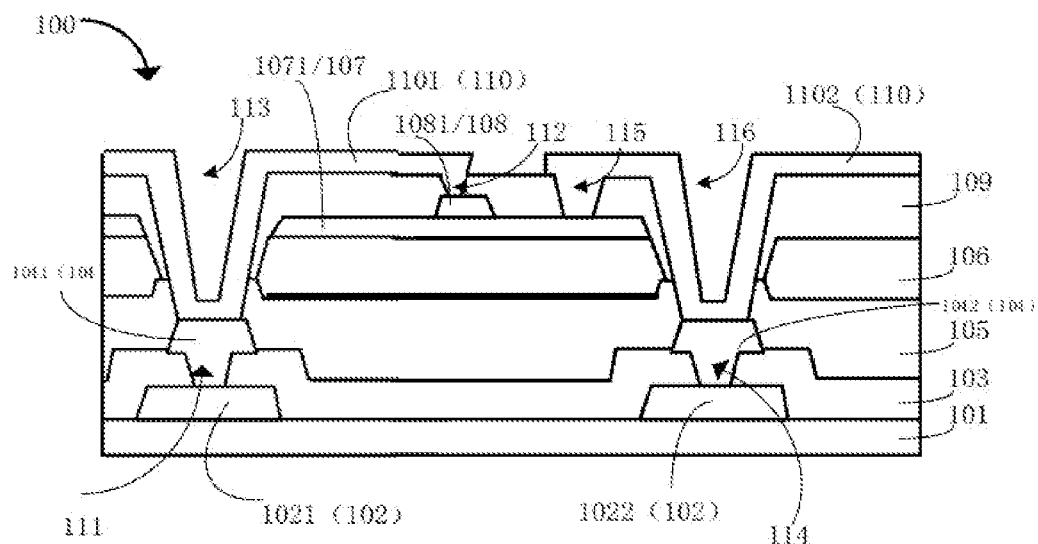
FIG. 1 is a schematic structural diagram of an array substrate according to an embodiment of the present disclosure.

Referring to FIG. 1, FIG. 1 is a schematic structural diagram of an array substrate according to an embodiment of the present disclosure. As shown in FIG. 1, the array substrate 100 of the embodiment of the present disclosure comprises a substrate 101, a first metal layer 102, a first insulating layer 103, a second metal layer 104, a second insulating layer 105, a planarization layer 106, a common electrode layer 107, an auxiliary wire layer 108, a third insulating layer 109, and a pixel electrode layer 110. The substrate 101, the first metal layer 102, the first insulating layer 103, the second metal layer 104, the second insulating layer 105, the planarization layer 106, the common electrode layer 107, the auxiliary wire layer 108, the third insulating layer 109, and the pixel electrode layer 110 are stacked in sequence.

The first metal layer 102 comprises a gate, a scan line, a first signal lead wire 1021, and a second signal lead wire 1022. During process, the first metal layer 102 may be deposited on the substrate 101 by a deposition process, and then the gate, the scan line, the first signal lead wire 1021, and the second signal lead wire 1022 may be formed by a patterning process. It should be noted that both the first signal lead wire 1021 and the second signal lead wire 1022 in the embodiment of the present disclosure are used to receive common electrode signals.

The second metal layer 104 comprises a source, a drain, a data line, a first connection metal 1041, and a second connection metal 1042. During process, the second metal layer 104 may be deposited on the first insulating layer 103 by a deposition process, and then the source, the drain, the data line, the first connection metal 1041, and the second connection metal 1042 may be formed by a patterning process.

The common electrode layer 107 comprises a common electrode 1071. During process, the common electrode layer 107 may be deposited on the planarization layer 106 by a deposition process. The common electrode 1071 is a planar electrode disposed over an entire surface. In a liquid crystal display panel, the common electrode forms a horizontal electric field together with a pixel electrode, thereby realizing display. It should be noted that in a case where the pixel electrode is defined in a stripe shape and the common electrode 1071 is defined to cover an entire opening area, an auxiliary wire 1081 is disposed on the common electrode 1071 to reduce a resistance of the common electrode 1071 and a coupling effect caused by signal disturbance of the scan line and the data line, so that a display effect can be improved.

The auxiliary wire layer 108 comprises the auxiliary wire 1081. During process, the auxiliary wire layer 108 may be deposited on the common electrode layer 107 by a deposition process, and then the auxiliary wire 1081 may be formed by a patterning process. It can be understood that, no insulating layer is disposed between the auxiliary wire layer 108 and the common electrode layer 107, and the auxiliary wire layer 108 is in contact with the common electrode layer 107. That is, the auxiliary wire 1081 is disposed on the common electrode 1071 and contacts with the common electrode 1071.

The pixel electrode layer 110 comprises the pixel electrode, a first connection electrode 1101, and a second connection electrode 1102. During process, the pixel electrode layer 110 may be deposited on the third insulating layer 109 by a deposition process, and then the pixel electrode, the first connection electrode 1101, and the second connection electrode 1102 may be formed by a patterning process.

Specifically, continue to refer to FIG. 1, the array substrate is defined with a first via 111, a second via 112, a third via 113, a fourth via 114, a fifth via 115, and a sixth via 116. The first via 111 penetrates the first insulating layer 103 and is correspondingly disposed directly above the first signal lead wire 1021. The second via 112 penetrates the third insulating layer 109 and is correspondingly disposed directly above the auxiliary wire 1081. The third via 113 penetrates the third insulating layer 109, the auxiliary wire layer 108, the common electrode layer 107, the planarization layer 106, and the second insulating layer 105, and is correspondingly disposed directly above the first connection metal 1041. The fourth via 114 penetrates the first insulating layer 103, and is correspondingly disposed directly above the second signal lead wire 1022. The fifth via 115 penetrates the third insulating layer 109 and the auxiliary wire layer 108, and is correspondingly disposed directly above the common electrode 1071. The sixth via 116 penetrates the third insulating layer 109, the auxiliary wire layer 108, the common electrode layer 107, the planarization layer 106, and the second insulating layer 105, and is correspondingly disposed directly above the second connection metal 1042.

Wherein the first connection metal 1041 extends into the first via 111. The first connection electrode 1101 extends into the second via 112 and the third via 113. The auxiliary wire 1081 is connected to the first signal lead wire 1021 through the first connection electrode 1101 and the first connection metal 1041. The second connection metal 1042 extends into the fourth via 114. The second connection electrode 1102 extends into the fifth via 115 and the sixth via 116. The common electrode 1071 is connected to the second signal lead wire 1022 through the second connection electrode 1102 and the second connection metal 1042.

It can be understood that in a conventional array substrate, a common electrode signal is transmitted to a common electrode through only one signal lead wire, and then the common electrode signal is transmitted to an auxiliary wire through the common electrode. That is, there is only one path in the conventional array substrate for transmitting the common electrode signal to the common electrode and the auxiliary wire. The array substrate 100 provided in this embodiment transmits a common electrode signal to the auxiliary wire 1081 through the first signal lead wire 1021, and transmits the common electrode signal to the common electrode 1071 through the second signal lead wire 1022. That is, there are two paths in the array substrate 100 in the embodiment of the present disclosure for transmitting the common electrode signal to the common electrode 1071 and the auxiliary wire 1081.

The array substrate 100 in the embodiment of the present disclosure comprises a first path and a second path for transmitting the common electrode signal to the common electrode 1071 and the auxiliary wire 1081. In the first path, the common electrode signal is transmitted to the auxiliary wire 1081 through the first signal lead wire 1021, the first connection metal 1041, and the first connection electrode 1101 in sequence. In the second path, the common electrode signal is transmitted to the common electrode 1071 through the second signal lead wire 1022, the second connection metal 1042, and the second connection electrode 1102 in sequence. That is, in the embodiment of the present disclosure, the common electrode signal is transmitted to the auxiliary wire 1081 and the common electrode 1071 through different signal lead wires, so that a plurality of identical common electrode signal loops can be formed. When the auxiliary wire 1081 is disconnected, the common electrode signal can be maintained through a plurality of paths, thereby ensuring stability of the common electrode signal and improving the display effect.

Figure 2:
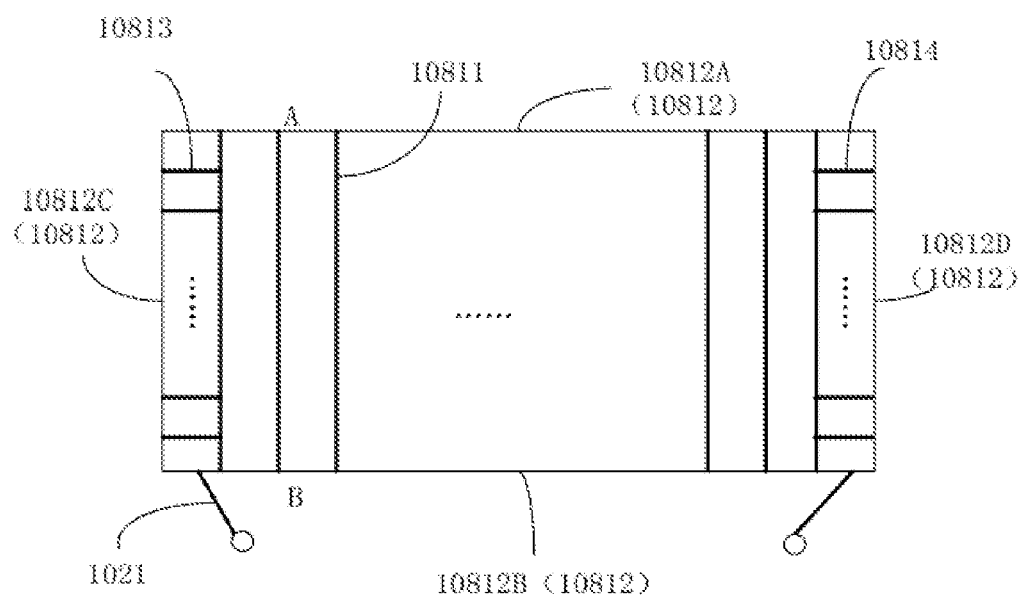
FIG. 2 is a schematic diagram of a first arrangement of an auxiliary wire and a first signal lead wire on an array substrate according to an embodiment of the present disclosure.

Further, referring to FIG. 2, FIG. 2 is a schematic diagram of a first arrangement of the auxiliary wire and the first signal lead wire on the array substrate according to an embodiment of the present disclosure. Combined with FIG. 1 and FIG. 2, the auxiliary wire 1081 comprises a plurality of first auxiliary wires 10811, a second auxiliary wire 10812, a plurality of third auxiliary wires 10813, and a plurality of fourth auxiliary wires 10814. The plurality of first auxiliary wires 10811 are spaced apart in a first direction, and each of the first auxiliary wires 10811 extends in a second direction. Each first auxiliary wire 10811 is connected to the second auxiliary wire 10812, and the second auxiliary wire 10812 is connected to the first signal lead wire 1021. The plurality of third auxiliary wires 10813 are spaced apart in the second direction. The plurality of fourth auxiliary wires 10814 are spaced apart in the second direction. The first signal lead wire 1021 is connected to the auxiliary wire 1081.

The second auxiliary wire 10812 comprises a first wire segment 10812A, a second wire segment 10812B, a third wire segment 10812C, and a fourth wire segment 10812D. The first wire segment 10812 A is disposed opposite to the second wire segment 10812B. The third wire segment 10812C is disposed opposite to the fourth wire segment 10812D. The first wire segment 10812A, the third wire segment 10812C, the second wire segment 10812B, and the fourth wire segment 10812D are sequentially connected end to end. Each of the first auxiliary wires 10811 comprises oppositely disposed first and second ends A and B. The first end A is connected to the first wire segment 10812A, and the second end B is connected to the second wire segment 10812B. The third wire segment 10812C is connected to the first auxiliary wire 10811 close to the third wire segment 10812C through the plurality of third auxiliary wires 10813. The fourth wire segment 10812D is connected to the first auxiliary wire 10811 close to the fourth wire segment 10812D through the plurality of fourth auxiliary wires 10814.

It should be noted that in the embodiment of the present disclosure, since the auxiliary wire 1081 and the first signal lead wire 1021 are located in different layers, vias are needed to be defined on the array substrate 100, so that the auxiliary wire 1081 and the first signal lead wire 1021 can be connected through the vias. Those skilled in the art may properly define vias on the array substrate as necessary to connect the auxiliary wire 1081 and the first signal lead wire 1021.

Figure 3:
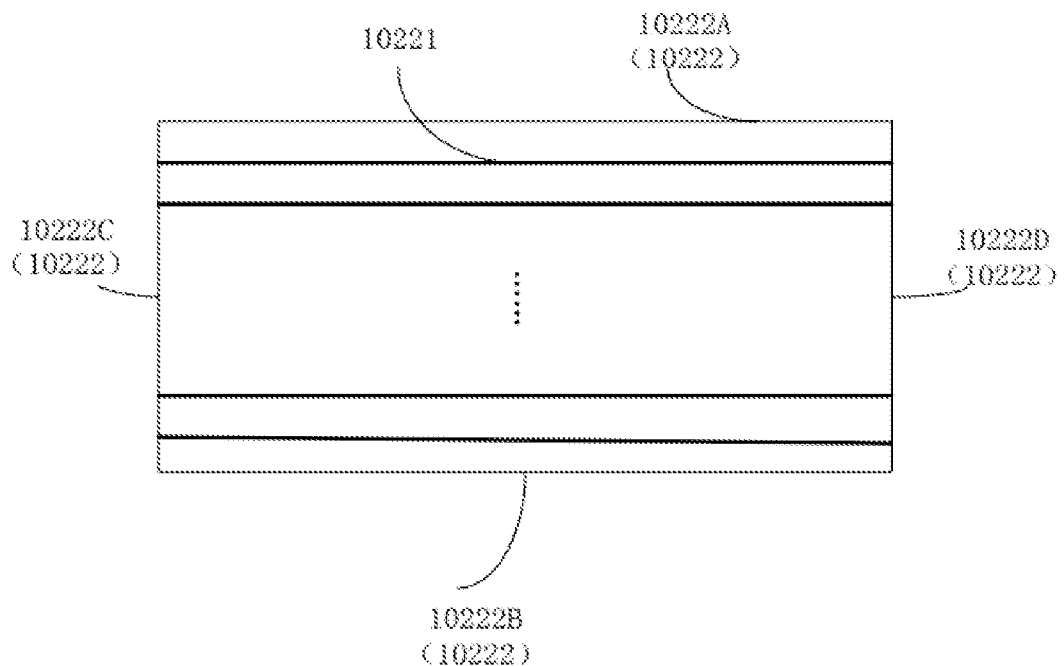
FIG. 3 is a schematic diagram of an arrangement of a second signal lead wire on an array substrate according to an embodiment of the present disclosure.

Further, referring to FIG. 3, FIG. 3 is a schematic diagram of an arrangement of the second signal lead wire on the array substrate according to an embodiment of the present disclosure. Combined FIG. 1 with FIG. 3, the second signal lead wire 1022 comprises a plurality of first sub-signal lead wires 10221 and a second sub-signal lead wire 10222. The plurality of first sub-signal lead wires 10221 are spaced apart in the second direction, and each first sub-signal lead wire 10221 extends in the first direction. Each first sub-signal lead wire 10221 is connected to the second sub-signal lead wire 10222. The second sub-signal lead wire 10222 is connected to the common electrode 1071.

The second sub-signal lead wire 10222 comprises a first portion 10222A, a second portion 10222B, a third portion 10222C, and a fourth portion 10222D. The first portion 10222A, the third portion 10222C, the second portion 10222B, and the fourth portion 10222D are sequentially connected end to end and are disposed around the plurality of first sub-signal lead wires 10221.

It should be noted that in the embodiment of the present disclosure, since the common electrode 1071 and the second signal lead wire 1022 are located in different layers, vias are needed to be defined on the array substrate 100, so that the common electrode 1071 and the second signal lead wire 1022 can be connected through the vias. Those skilled in the art may properly defines vias on the array substrate 100 as necessary to connect the common electrode 1071 and the second signal lead wire 1022.

Figure 4:
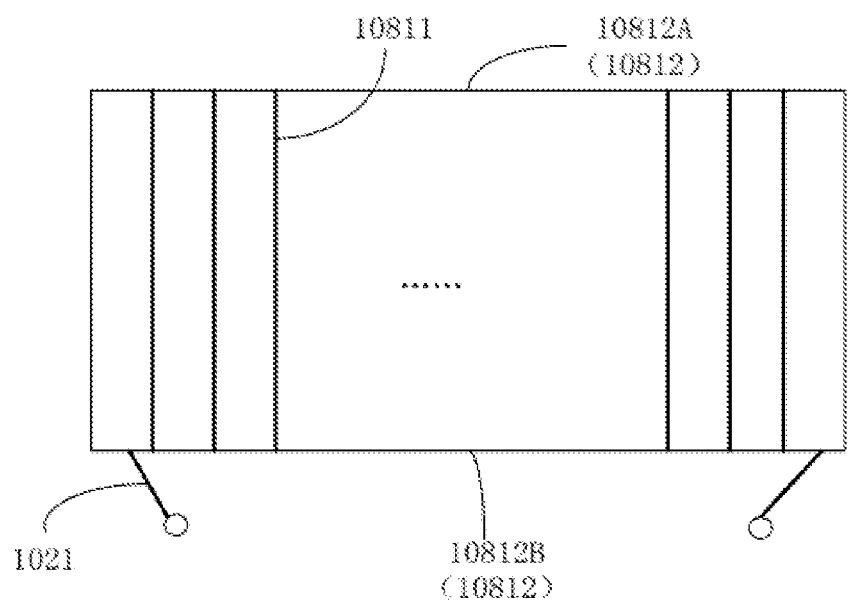
FIG. 4 is a schematic diagram of a second arrangement of an auxiliary wire and a first signal lead wire on an array substrate according to an embodiment of the present disclosure.

Referring to FIG. 4, FIG. 4 is a schematic diagram of a second arrangement of an auxiliary wire and a first signal lead wire on an array substrate according to an embodiment of the present disclosure. The array substrate 100 shown in FIG. 4 differs from the array substrate 100 shown in FIG. 2 in that the second auxiliary wire 10812 on the array substrate 100 shown in FIG. 2 comprises the first wire segment 10812A, the second wire segment 10812B, the third wire segment 10812C, and the fourth wire segment 10812D. A second auxiliary wire 10812 on the array substrate 100 comprises a first wire segment 10812A and a second wire segment 10812B.

In contrast to the array substrate shown in FIG. 2, the array substrate 100 shown in FIG. 4 does not need to provide the third wire segment 10812C and the fourth wire segment 10812D on the premise that a plurality of first auxiliary wires 10811 are connected to the second auxiliary wire 10812, which can increase a wiring space of the array substrate 100.

Figure 5:
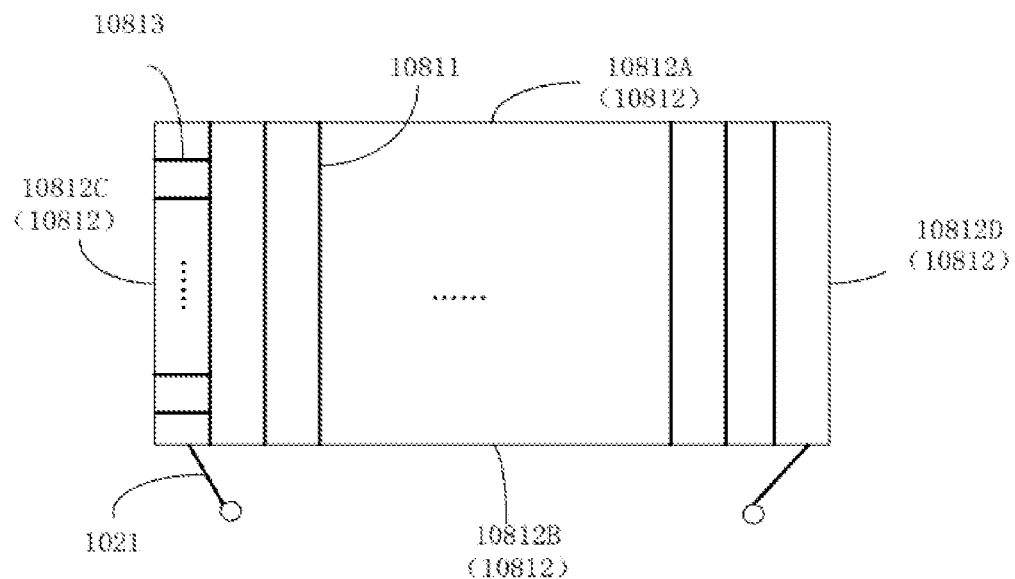
FIG. 5 is a schematic diagram of a third arrangement of an auxiliary wire and a first signal lead wire on an array substrate according to an embodiment of the present disclosure.

Referring to FIG. 5, FIG. 5 is a schematic diagram of a third arrangement of an auxiliary wire and a first signal lead wire on an array substrate according to an embodiment of the present disclosure. The array substrate 100 shown in FIG. 5 differs from the array substrate 100 shown in FIG. 2 in that the auxiliary wire 1081 on the array substrate 100 shown in FIG. 2 comprises the plurality of first auxiliary wires 10811, the second auxiliary wire 10812, the plurality of third auxiliary wires 10813, and the plurality of fourth auxiliary wires 10814. An auxiliary wire 1081 on the array substrate 100 shown in FIG. 5 comprises a plurality of first auxiliary wires 10811, a second auxiliary wire 10812, and a plurality of third auxiliary wires 10813. The array substrate 100 shown in FIG. 5 can increase the wiring space of the array substrate 100 combined with the array substrate 100 shown in FIG. 2.

In the array substrate provided in the embodiments of the present disclosure, the common electrode signal is transmitted to the auxiliary wire through the first signal lead wire and transmitted to the common electrode through the second signal lead wire by providing the first signal lead wire and the second signal lead wire. That is, the common electrode signal is transmitted to the auxiliary wire and the common electrode through different signal lead wires, so that a plurality of identical common electrode signal loops can be formed. When the auxiliary wire is disconnected, the common electrode signal can be maintained through a plurality of paths, thereby ensuring the stability of the common electrode signal and improving the display effect.

Figure 6:
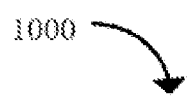
FIG. 6 is a schematic structural diagram of a liquid crystal display panel according to an embodiment of the present disclosure.

Referring to FIG. 6, FIG. 6 is a schematic structural diagram of a liquid crystal display panel according to an embodiment of the present disclosure. The liquid crystal display panel 1000 provided in the embodiment of the present disclosure comprises an array substrate 1001 including the array substrate described above, a color film substrate 1002, and a liquid crystal layer 1003. The liquid crystal layer 1003 is disposed between the array substrate 1001 and the color film substrate 1002. For details of the array substrate 1001, please refer to the above description.

In the liquid crystal display panel provided in the embodiment of the present disclosure, the common electrode signal is transmitted to the auxiliary wire through the first signal lead wire and transmitted to the common electrode through the second signal lead wire by providing the first signal lead wire and the second signal lead wire. That is, the common electrode signal is transmitted to the auxiliary wire and the common electrode through different signal lead wires, and a plurality of identical common electrode signal loops can be formed. When the auxiliary wire is disconnected, the common electrode signal can be maintained through a plurality of paths, thereby ensuring the stability of the common electrode signal and improving the display effect.

The array substrate and the liquid crystal display panel provided in the embodiments of the present disclosure are described in detail above. In the present disclosure, specific examples are used to illustrate principles and implementation of the present disclosure. The descriptions of the above embodiments are only used to help understand methods and core ideas of the present disclosure. At the same time, for those skilled in the art, according to the idea of the present disclosure, specific implementation and scope of application can be changed. In summary, the content of this specification should not be construed as a limitation to the present disclosure.

What is claimed is:

1. An array substrate, comprising:
   a common electrode, wherein the common electrode is a planar electrode;
   an auxiliary wire disposed on the common electrode and in contact with the common electrode; and
   a signal lead wire comprising a first signal lead wire connected to the auxiliary wire and a second signal lead wire connected to the common electrode; and
   a pixel electrode layer, located on a side of the auxiliary wire away from the common electrode; wherein the pixel electrode layer comprises a pixel electrode, a first connection electrode, and a second connection electrode arranged in a same layer; the common electrode is connected to the second signal lead wire through the second connection electrode, and the auxiliary wire is connected to the first signal lead wire through the first connection electrode.

2. The array substrate according to claim 1, wherein the auxiliary wire comprises a plurality of first auxiliary wires and a second auxiliary wire; the plurality of first auxiliary wires are spaced apart in a first direction, each of the first auxiliary wires extends in a second direction; each of the first auxiliary wires is connected to the second auxiliary wire, and the second auxiliary wire is connected to the first signal lead wire.

3. The array substrate according to claim 2, wherein the second auxiliary wire comprises a first wire segment and a second wire segment; and each of the first auxiliary wires comprises a first end and a second end, the first end is connected to the first wire segment, and the second end is connected to the second wire segment.

4. The array substrate according to claim 3, wherein the second auxiliary wire further comprises a third wire segment and a fourth wire segment, and the first wire segment, the third wire segment, the second wire segment, and the fourth wire segment are sequentially connected end to end.

5. The array substrate according to claim 4, wherein the auxiliary wire further comprises a plurality of third auxiliary wires spaced apart in the second direction; and
   the third wire segment is connected to the first auxiliary wire close to the third wire segment through the plurality of third auxiliary wires.

6. The array substrate according to claim 5, wherein the auxiliary wire further comprises a plurality of fourth auxiliary wires spaced apart in the second direction; and
   the fourth wire segment is connected to the first auxiliary wire close to the fourth wire segment through the plurality of the fourth auxiliary wires.

7. The array substrate according to claim 1, wherein the second signal lead wire comprises a plurality of first sub-signal lead wires and a second sub-signal lead wire; and
   the plurality of first sub-signal lead wires are spaced apart in the second direction, each of the first sub-signal lead wires extends in the first direction; and each of the first sub-signal lead wires is connected to the second sub-signal lead wire.

8. The array substrate according to claim 7, wherein the second sub-signal lead wire comprises a first portion, a second portion, a third portion, and a fourth portion, the first portion, the third portion, the second portion, and the fourth portion are sequentially connected end to end and surround the plurality of first sub-signal lead wires.

9. The array substrate according to claim 1, wherein the array substrate comprises a substrate, a first metal layer comprising the first signal lead wire and the second signal lead wire, a first insulating layer, a second metal layer, a second insulating layer, a planarization layer, a common electrode layer comprising the common electrode, an auxiliary wire layer comprising the auxiliary wire, and a third insulating layer stacked in sequence.

10. The array substrate according to claim 9, wherein the array substrate is defined with a first via, a second via, and a third via, the first via penetrates the first insulating layer, the second via penetrates the third insulating layer, the third via penetrates the third insulating layer, the auxiliary wire layer, the common electrode layer, the planarization layer, and the second insulating layer; and
   the second metal layer comprises a first connection metal extending into the first via; the first connection electrode extends into the second via and the third via; and the auxiliary wire is connected to the first signal lead wire through the first connection electrode and the first connection metal.

11. The array substrate according to claim 9, wherein the array substrate is defined with a fourth via, a fifth via, and a sixth via, the fourth via penetrates the first insulating layer, the fifth via penetrates the third insulating layer and the auxiliary wire layer, and the sixth via penetrates the third insulating layer, the auxiliary wire layer, the common electrode layer, the planarization layer, and the second insulating layer; and
   the second metal layer comprises a second connection metal extending into the fourth via; the second connection electrode extends into the fifth via and the sixth via; and the common electrode is connected to the second signal lead wire through the second connection electrode and the second connection metal.

12. A liquid crystal display panel, comprising:
an array substrate;
a color film substrate disposed opposite to the array substrate; and
a liquid crystal layer disposed between the array substrate and the color film substrate;
the array substrate comprises:
a common electrode, wherein the common electrode is a planar electrode;
an auxiliary wire disposed on the common electrode and in contact with the common electrode; and
a signal lead wire comprising a first signal lead wire connected to the auxiliary wire and a second signal lead wire connected to the common electrode; and
a pixel electrode layer, located on a side of the auxiliary wire away from the common electrode; wherein the pixel electrode layer comprises a pixel electrode, a first connection electrode, and a second connection electrode arranged in a same layer; the common electrode is connected to the second signal lead wire through the second connection electrode, and the auxiliary wire is connected to the first signal lead wire through the first connection electrode.

13. The liquid crystal display panel according to claim 12, wherein the auxiliary wire comprises a plurality of first auxiliary wires and a second auxiliary wire; the plurality of the first auxiliary wires are spaced apart in a first direction, each of the first auxiliary wires extends in a second direction; and each of the first auxiliary wires is connected to the second auxiliary wire, and the second auxiliary wire is connected to the first signal lead wire.

14. The liquid crystal display panel according to claim 13, wherein the second auxiliary wire comprises a first wire segment and a second wire segment; and
each of the first auxiliary wires comprises a first end and a second end, the first end is connected to the first wire segment, and the second end is connected to the second wire segment.

15. The liquid crystal display panel according to claim 14, wherein the second auxiliary wire further comprises a third wire segment and a fourth wire segment, and the first wire segment, the third wire segment, the second wire segment, and the fourth wire segment are sequentially connected end to end.

16. The liquid crystal display panel according to claim 15, wherein the auxiliary wire further comprises a plurality of third auxiliary wires spaced apart in the second direction; and
the third wire segment is connected to the first auxiliary wire close to the third wire segment through the plurality of third auxiliary wires.

17. The liquid crystal display panel according to claim 16, wherein the auxiliary wire further comprises a plurality of fourth auxiliary wires spaced apart in the second direction; and
the fourth wire segment is connected to the first auxiliary wire close to the fourth wire segment through the plurality of the fourth auxiliary wires.

18. The liquid crystal display panel according to claim 12, wherein the second signal lead wire comprises a plurality of first sub-signal lead wires and a second sub-signal lead wire; and
the plurality of first sub-signal lead wires are spaced apart in the second direction, each of the first sub-signal lead wires extends in the first direction; and each of the first sub-signal lead wires is connected to the second sub-signal lead wire.

19. The liquid crystal display panel according to claim 18, wherein the second sub-signal lead wire comprises a first portion, a second portion, a third portion, and a fourth portion, the first portion, the third portion, the second portion, and the fourth portion are sequentially connected end to end and surround the plurality of first sub-signal lead wires.

20. The liquid crystal display panel according to claim 12, wherein the array substrate comprises a substrate, a first metal layer comprising the first signal lead wire and the second signal lead wire, a first insulating layer, a second metal layer, a second insulating layer, a planarization layer, a common electrode layer comprising the common electrode, an auxiliary wire layer comprising the auxiliary wire, and a third insulating layer stacked in sequence.

* * * * *